United States Patent [19]

Bäumer et al.

[11] 3,770,379

[45] Nov. 6, 1973

[54] INDICATOR FOR THE DETECTION OF MANGANESE (II) IONS

[75] Inventors: Wilhelm Bäumer; Dieter Schmitt; Alfred Stein, all of Darmstadt, Germany

[73] Assignee: Merck Patent Gesellschaft mit beschrankter Haftung, Darmstadt, Germany

[22] Filed: Mar. 9, 1972

[21] Appl. No.: 233,316

[30] Foreign Application Priority Data

Mar. 10, 1971 Germany.................. P 21 11 366.6

[52] U.S. Cl............ 23/230 R, 23/253 TP, 252/408
[51] Int. Cl. .......................................... G01n 31/22
[58] Field of Search .................... 23/230 R, 253 TP; 252/408

[56] References Cited
OTHER PUBLICATIONS

Stratton et al., Anal. Chem. 4, No. 1, Jan. 1932, p. 2.
Sastry et al., Anal. Chem. 34, No. 10, Sept. 1962, p. 1,302–1,303.

*Primary Examiner*—Robert M. Reese
*Attorney*—I. William Millen et al.

[57] ABSTRACT

Indicator for the detection of manganese (II) ions comprising an abosrbent support carrier impregnated with a substantially insoluble sulfate salt of an aromatic amine oxidizable by $MnO_2$ to a colored oxidation product.

20 Claims, No Drawings

INDICATOR FOR THE DETECTION OF MANGANESE (II) IONS

BACKGROUND OF THE INVENTION

This invention relates to an indicator and process for the colorimetric determination of manganese (II) ions and method for the production thereof.

In analytical chemistry, the use of identification reagents for the colorimetric determination of certain metal ions has become increasingly important. Test sticks for making semiquantitative determinations in a simple manner are particularly desirable.

Test papers are known by which managanese (II) ions can be detected. This test is based on the color reaction rendered by certain aromatic amines during oxidation. In order to conduct the test, these test papers are immersed into the solution to be tested for magnanese ions, and then into 1-2N sodium hydroxide solution, which converts any manganese ions in the test solution to manganese dioxide in situ on the test paper by the effect of atmospheric oxygen. Then, the test paper is bathed in dilute acetic acid, thus producing a blue to violet color, depending on the aromatic amine employed and the pressure or absence of manganese ions in the test solution.

However, the above-described test papers have the serious disadvantage that they assume a blue to brown color during manufacture and packaging in daylight. Thus, semi-quantitative manganese determinations are impossible with such a test paper. An additional disadvantage is that, upon immersion of the test paper into the test solution, a concentration gradient is produced on the paper, which makes it impossible to associate the thus-formed color with a standard color scale in a satisfactory manner. Furthermore, iron (III) ions, in particular, interfere because these ions enclose and/or add manganese (II) ions during the formation of iron (III) hydroxide. The field of application of the conventional $Mn^{++}$ indicator is consequently quite limited.

It has now been found that these disadvantages can be avoided by $Mn^{++}$ indicators of this invention, which can be stored without color development. These indicators can also be used for semi-quantitative determination because with the same manganese contents, substantially identical coloring is developed. It is also possible to effect semiquantitative determination of solutions containing a low manganese (II) ion concentration but high iron (III) ion concentrations. Surprisingly, by means of the novel indicator of this invention, satisfatory linear correlation between manganese ion concentration and thus-produced depth of color development is achieved. Consequently, the novel indicators are substantially superior to the known indicating methods. Moreover, the indicators can be used to detect manganese (III) ions which occur very rarely in the solutions being tested.

SUMMARY OF THE INVENTION

The indicators of the detection of manganese (II) ions of this invention comprise an absorbent support impregnated with a substantially insoluble sulfate salt of an aromatic amine oxidizable by manganese dioxide to a colored oxidation product. In its method of use aspect, this invention relates to a method for the detection of $Mn^{++}$ ions in a test solution employing an indicator of this invention. In its process aspect, this invention relates to the production of an indicator of this invention by the impregnation of an absorbent support with a solution containing an aromatic amine as defined herein, a water soluble metal sulfate and an organic Fe ion complexing agent.

DETAILED DISCUSSION

Suitable absorbent supports or carriers include those customarily employed for the production of indicator reagents. Filter paper is most commonly employed. However, other forms of absorbent cellulose and cellulose derivatives and absorbent products, e. g., polyester fiber and fiberglass laminate can likewise be used.

Suitable aromatic amines are those capable of forming a sulfate salt of low-solubility and which is oxidizable by manganese dioxide. If the amine is colored, and it preferably is not, the oxidation product must exhibit a color different from the free aromatic amine of the sulfate salt thereof.

The exact structure of the aromatic amine is not critical so long as its sulfate salt is substantially insoluble in water and the amine is oxidizable by $MnO_2$ under the test conditions, e.g., about room temperature after immersion in strong base followed by moderately strong acid, e.g., 10 percent aqueous acetic acid, and its oxidation product is colored and the starting amine is colorless or a different color than its oxidation product. "Substantially insoluble" as used herein means a solubility preferably less than 1 percent and more preferably less than 0.2 percent in water at room termperature. The requirement that the oxidation product is colored is readily met because many aromatic amines are readily oxidized to colored oxidation products.

Preferred aromatic amines are primary amines, especially those containing at least two primary amine groups. The aromaticity is preferably provided by a benzene ring, more preferably at least two benzene rings, each bearing a primary amine group, bonded or fused together to form, e.g., a biphenyl, naphthalene, flurene, anthracene, etc. ring system. The aromatic amine can bear one or more other substituents, e. g., alkoxy or alkyl of one to four atoms, nitro, cyano, halo, e. g., Cl, Br, etc.

More particularly amines of thhe general formula

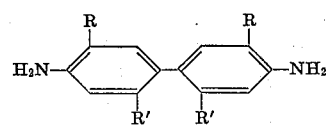

wherein the radicals R, which can be the same or different, are H, lower alkoxy of one to four carbon atoms, lower alkyl of one to four carbon atoms, halogen, nitro, or cyano, and the radicals R' are each H, or together —$CH_2$—, —NH—, —S—, or —O—are used in the present invention. Especially preferred aromatic amines are those containing the same radicals R, in particular o-tolidine, benzidine, o-dianisidine and 2,7-diaminofluorene.

Since manganese is very frequently associated with iron in the solutions to be tested and the detection of manganese is considerably impaired thereby, it is advantageous that the absorbent support or carrier additionally is impregnated with a complex-forming agent which is capable of complexing iron ions and other heavy metal ions, but not manganese (II) ions and manganese (III) ions. Particularly advantageous are tartaric acid, citric acid and/or the salts thereof.

It is particularly advantageous to impregnate the absorbent support successively with at least two different solutions which in each case contain only part of the above-indicated components. If different solutions are used for the impregnating step, it is necessary to at least partially dry the absorbent support between the impregnation operations so as to enable the absorption thereon of the second imprenating solution.

A convenient method of uniformly impregnating the adsorbent carrier support with the selected slightly soluble aromatic amine sulfate is to successively impregnate, in either order, the carrier with an aqueous or solvent solution of the free amine or a soluble salt thereof and with a solution of soluble metal sulfate, e.g., alkali-metal or alkaline earth sulfate. Preferably the aromatic amine solution is applied first and then, preferably after drying the amine-impregnated support, a solution of a soluble metal sulfate is added in molar proportion at least sufficient to convert all of the amine to its amine sulfate salt and preferably in a substantial excess. For this purpose, all water-soluble alkali sulfates and/or alkaline earth sulfates are usable, preferably sodium, potassium, and magnesium sulfate, particularly magnesium sulfate.

It is also possible to impregnate the absorbent carrier with the amine sulfate by forming a suspension of the amine sulfate by mixing a solution of the amine or a soluble salt thereof with a solution of the metal sulfate and then impregnating the absorbent support with the resulting suspension. Furthermore, it is possible to add the low-solubility sulfate of the aromatic amine to a pulp of paper fibers and then manufacture a test paper therefrom a conventional manner on a sheet-producing or a papermaking machine. This paper can thereafter optionally be impregnated with an organic Fe complex-forming agent.

Ordinarily, it is advantageous to employ two different impregnating solutions, by means of which the absorbent support is successively impregnated, preferably first with the amine.

The concentration of the aromatic amine and metal sulfate in the impregnating solution or solutions is not critical. For example, the impregnating solution can contain the aromatic amine, metal sulfate and, optionally, the iron ion complexing agent in the following concentrations:

0.05 – 1 percent of aromatic amine,
0.05 – 4 percent of a water-soluble alkali sulfate and-/or alkaline earth sulfate, and preferably in at least one of the impregnating solutions,
0.2 – 5 percent of an organic complex-forming agent capable of forming complexes with iron ions.

For producing a first impregnating solution I, dissolve 0.05 – 1 g. of the aromatic amine in 100 ml. of an organic aqueous organic or aqueous solvent, e. g., dilute aqueous acetic acid. Suitable organic solvents include the lower alkanols, especially methanol, other readily volatile organic solvents, e. g., keytones, ethers, esters and aliphatic and aromatic halohydrocarbons and hydrocarbons, in which the aromatic amine is soluble can also be used.

To prepare a second impregnating solution II, dissolve 0.05 – 4 g. of a water-soluble metal sulfate, e.g., alkali sulfate and/or alkaline earth sulfate, optionally also 0.2 – 5 g. of the organic complexing agent in 100 ml. of water.

The absorbent carriers, preferably filter paper, are successively impregnated with the impregnating solution or solutions in a conventional manner so as to provide a pickup of the solution of about 150–300 percent, preferably about 100–200 percent, calculated on the dry weight of the carrier. The impregnated papers can either be cut into handy strips, or they can be processed into preferably square pieces. They can then be conventionally glued onto plastic films, paper strips, or metallic strips, or sealed onto or into such films and strips.

The indicators of the invention, as they are used for the colorimetric determination of manganese ions, comprise an absorbent carrier uniformly impregnated (per $m^2$ of surface area) with 0.1–10g., preferably 0.5–3 g., of the aromatic amine sulfate. Ordinarily, unless it is removed by post-washing of the novel impregnated carrier, there will also be adsorbed thereon other reaction products resulting from the exchange reaction of the amine (or a soluble salt thereof) and the soluble metal sulfate, e.g., sodium or magnesium acetate. Preferably, there is also impregnated therein from one-fifth to 100 times by weight, calculated on the amine sulfate, of an iron ion organic-complexing agent.

To detect manganese ions, one of the above-mentioned strips is immersed into the solution to be tested, until the testing zone of the test strip is fully wetted. Then, the testing zone is first briefly bathed, e.g., about 15 seconds, in a strongly alkaline solution, e.g., 1–2N sodium hydroxide, to raise the pH to about 14 or higher. During this step, any manganese (II) hydroxide which is formed is further oxidized to manganese dioxide by the atmospheric oxygen present. Thereafter, the testing zone is bathed for about 15 seconds in dilute acid, e.g., 10 percent strength acetic acid, to lower the pH to an acid pH. In this acidic medium, the aromatic amine is oxidized by the thus-formed manganese dioxide to the corresponding dyestuff. When manganese ions are present in the solution to be tested, the testing zone is then colored usually blue, the exact color depending on the selected aromatic amine. This coloring is compared with a standard color scale obtained on using solutions of varying known $Mn^{++}$ concentrations. The manganese ion concentration of the test solution can readily be determined by color comparision with the colors developed with the known $Mn^{++}$ solutions. In this semiquantitative manner, distinct shading of the blue coloring can be perceived between 10, 25, 50, 100, 250 and 500 mg./l. (or p.p.m.) of manganese ions. The novel indicator is also distinguished by a very high selectivity and sensitivity. It is possible to detect with certainty the presence of as little as 10 mg./l. of manganese ions by the blue coloring which develops in the reagent zone of the test strip.

In the pH range of 1–7, the accuracy of detection is independent of the pH of the solution to be tested. In case of manganese ion contents of more than 500 mg./l., the solution to be tested or an aliquot portion thereof, is first diluted to such an extent that a blue coloration lying within the varying color scale is attained. By multiplication, in accordance with the selected dilution, a semi-quantitative indication of the concentration of the manganese ions is also obtained in this manner with solutions of high Mn concentration.

The novel indicator is very specific; the influence of other cations on the test is extremely minor. Thus, the detection is not impaired by less than 1,000 mg./l. respectively, of the following ions: $Al^{3+}$, $As^{3+}$, $Ba^{2+}$, $Be^{2+}$, $Bi^{3+}$, $Ca^{2+}$, $Cd^{2+}$ $Co^{2+}$, $Cu^{2+}$, $Fe^{3+}$, $Hg^{2+}$, $K^+$, $Li^+$, $Mg^{2+}$ $NH_4^+$, $Na^+$, $Ni^{2+}$, $Pb^{2+}$, $Rb^+$, $Sb^{3+}$, $Sn^{2+}$, $Il^+$, $Zn^{2+}$, $Zr^{4+}$.

If the thus-produced color of the testing zone deviates from the color scale, the disturbance may be due to concentration of foreign ions which are too high. In this case, the interfering ions must be masked by adding to the solution to be tested a small amount of a masking substance, e.g., a spatula-tip amount to about 5 ml. of the solution.

For example, $Ti^{4+}$ is masked with potassium fluoride, $Ag^+$ and $Hg^+$ can be separated by the addition of NaCl. In the case of very high iron (III) concentrations, sodium acetate is added to the acidic solution until a pH of 4 – 4.8 is attained. Then, the solution is briefly boiled, filtered, and the manganese ion concentration in the filtate is determined.

The influence of anions on the test is also extremely low. The indication is not impaired by less than respectively 1,000 mg./l. of $Br^-$, $BrO_3^-$, $CN^-$, $Cl^+$, $ClO_3^-$, $ClO_4^-$, $F^-$, $[Fe(CN)_6]^{4-}$, $I^-$, $IO_3^-$, $Mo_7O_{24}^{6-}$, $N_3^-$, $OCN^-$, $PO_4^{3-}$, $SCN^-$, $SeO_3^{2-}$, $SO_3^{2-}$, $SO_4^{2-}$, $S_2O_3^{2-}$, $S_2O_5^{2-}$, $WO_4^{2-}$, acetate, ascorbate, citrate, oxalate, succinate, tartrate, and 500 mg./l. of $S_2O_4^{2-}$.

The novel indicator thus exhibts considerable advantages over the previously known indicating reactions for manganese ions. For this first time, a shelf-stable indicator has been developed, by means of which simiquantitative determinations are possible with a very high degree of selectivity. The indivating accuracy is independent of the pH of the solution to be tested within a very wide pH range and the test functions eve in the presence of larger amounts of iron ions.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Filter paper (No. 604, Schleicher & Schüll) is impregnated with solution I, dried, impregnated with solution II and once again dried. The thus-obtained impregnated filter paper is cut into small squares of about 6 × 6 mm. and cemented to 6 × 60 mm plastic strips at the lower end thereof.

Impregnating solution I contains:
 1 g. of o-tolidine
 100 ml. of methanol.

Impregnating solution II contains:
 3 g. of magnesium sulfate heptahydrate
 1 g. of tartaric acid
 100 ml. of water.

The test strip after being immersed into a solution containing, in addition to iron (III) ions, 10 mg./l. of manganese ions, then bathing the testing zone first in 1–2N sodium hydroxide solution and then in about 10 percent strength aqueous acetic acid, exhibits a blue coloring accurately corresponding, upon comparison with the appropriate color scale, to a value of 10 mg./l. of $Mn^{2+}$.

EXAMPLE 2

This example is conducted analogously to Example 1, but the impregnating solution is 0.3 g. of o-tolidine in 100 ml. of 2 percent aqueous acetic acid. Impregnating solution II contains 2 g. of magnesium sulfate heptahydrate and 0.5 g. of tartaric acid in 100 ml. of water.

Analogous results are obtained when in place of o-tolidine a like amount of benzidine, o-dianisidine, 2,7-diaminofluorene, 3,3'-dipropylbenzidine, 3,3'-dipropyloxy-benzidine, 3,3'-dichlorobenzidine or 3,3'-dibromobenzidine is used.

Semiquantitative manganese determination can also be conducted with this indicator.

EXAMPLE 3

Impregnating solutions are produced analogously to Example 1, except that impregnating solution I contains, in place of o-tolidine, a like amount of 3,3'-dinitrobenzidine, 3,3'-dicyanobenzidine, 2,7-diaminocarbazole, 2,7-diaminodibenzothiophene, or 2,7-diaminodibenzofurane. The indicator shows, after immersion into the testing solution described in Example 1 and subsequent bathing in the solutions set forth therein, a blue to violet coloring, depending on the amine employed. When compared with the appropriate color scale, the coloring accurately indicates a content of 10 mg./l. of manganese ions.

EXAMPLE 4

The impregnating solutions analogous to Example 2 are combined under rapid agitation. A filter paper is impregnated with this suspension and then dried.

Semiquantitative manganese determinations can be conducted with this indicator also.

EXAMPLE 5

20 g. of pure linters paper is beaten in a solution of 0.2 g. of o-tolidine in 2 l. of 2 percent acetic acid. Under vigorous agitation, a solution of 0.3 g. of magnesium sulfate heptahydrate in 50 ml. of water is added dropwise to the slurry. From this fiber pulp, a paper is produced on a Fourdrinier paper-making machine. After drying, the paper can additionally be impregnated with a tartaric acid solution.

This paper is also well suited for determining manganese ion concentration down to 10 p.p.m.

The preceding examples can be repeated with similar success by substituting the generically or specifically described reacts and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An indicator for the colorimetric detection of manganese (II) ions, comprising an absorbent support uniformly impregnated with a substantially insoluble sulfate salt of an aromatic amine oxidizable by manganese dioxide to a colored oxidation product and represented by the general formula

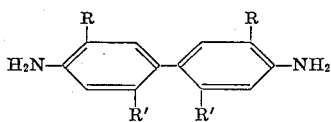

wherein the radicals R, which can be the same or different, are H, lower alkoxy of one to four carbon atoms, lower alkyl of one to four carbon atoms, halogen, nitro, or cyano, and the radicals R' are each H, or together —$CH_2$—, —NH—, —S—, or —O—.

2. An indicator according to claim 1 impregnated with an iron ion complex-forming agent.

3. An indicator according to claim 2 wherein the complex-forming agent is tartaric or citric acid.

4. The indicator according to claim 1, wherein the aromatic amine is o-tolidine, benzidine, o-dianisidine or 2,7-diaminofluorene.

5. An indicator according to claim 4, impregnated with an iron ion complex-forming agent.

6. An indicator according to claim 5, wherein the complex-forming agent is tartaric or citric acid.

7. An indicator according to claim 6 wherein the amine is o-tolidine

8. A process for preparing an indicator according to claim 1, which comprises impregnating the absorbing support with one or more impregnating solutions collectively containing
 a 0.05 – 1 percent solution of an aromatic amine and
 a 0.05 – 4 percent solution of one or both of a water-soluble alkali sulfate and an alkaline earth sulfate.

9. A process according to claim 8 wherein one of the impregnating solutions contains 0.2 – 5 percent of organic complexing agent, capable of forming complexes with iron ions.

10. A process according to claim 9 wherein the organic complexing agent is tartaric acid, citric acid or a salt thereof.

11. A process according to claim 9, wherein the adsorbent carrier is first impregnated with a solution of the organic amine, dried and thereafter impregnated with a solution of the metal sulfate.

12. A process according to claim 11 wherein the aromatic amine is dissolved in an organic solvent or dilute acetic acid.

13. A process according to claim 12, wherein a water-soluble metal salt is in an aqueous solution.

14. A process according to claim 13 wherein the metal sulfate is one or more of sodium, potassium, and magnesium sulfate.

15. A process for the colorimetric determination of manganese ions in aqueous solutions which comprises moistening an indicator of claim 1 with the aqueous solution to be tested.

16. A process for the colorimetric determination of manganese ions in aqueous solutions which comprises moistening an indicator of claim 2 with the aqueous solution to be tested.

17. A process for the colorimetric determination of manganese ions in aqueous solutions which comprises moistening an indicator of claim 3 with the aqueous solution to be tested.

18. A process for the colorimetric determination of manganese ions in aqueous solutions which comprises moistening an indicator of claim 4 with the aqueous solution to be tested.

19. A process for the colorimetric determination of manganese ions in aqueous solutions which comprises moistening an indicator of claim 5 with the aqueous solution to be tested.

20. A process for the colorimetric determination of manganese ions in aqueous solutions which comprises moistening an indicator of claim 6 with the aqueous solution to be tested.

* * * * *